United States Patent [19]
Kraft et al.

[11] Patent Number: 5,451,188
[45] Date of Patent: Sep. 19, 1995

[54] DRIVER-CONTROLLED DIFFERENTIAL LOCK CONTROL SYSTEM

[75] Inventors: Anthony J. Kraft; Michael J. Lehman; David A. Schaller, all of Fort Wayne; Charles D. Sims, Columbia City; William R. Heign, Bluffton, all of Ind.

[73] Assignee: Navistar International Transportation Corp., Chicago, Ill.

[21] Appl. No.: 159,632

[22] Filed: Nov. 30, 1993

[51] Int. Cl.6 ............................................. F16H 48/22
[52] U.S. Cl. .................................................... 475/237
[58] Field of Search ......................... 475/231, 237, 254

[56] References Cited

U.S. PATENT DOCUMENTS

| 4,955,853 | 9/1990 | Bausch | 475/241 |
| 5,366,041 | 11/1994 | Shiraishi et al. | 180/248 |

OTHER PUBLICATIONS

"Drive Instruction Kit #TP-8611 Driver Controlled Differential Lock" Rockwell International, Nov. 1991.
"Technical Service Aid—Installing and Operationg Axles Equipped with a Roofwell Driver Controlled Main Differential Lock".
Rockwell International Corp. #TSA-2-113, Jul., 1985.

*Primary Examiner*—Dirk Wright
*Attorney, Agent, or Firm*—Dennis K. Sullivan

[57] ABSTRACT

A driver-controlled differential lock control system allows vehicles with automatic, electronic and single range manual transmissions and air pressure actuated differential locking devices to have the vehicle differential thereof locked on only at low speeds. The control system includes a vehicle speed sensor, such as a speedometer transmitter, and a speed switch responsive to the vehicle speed sensor to selectively actuate a normally-closed air solenoid valve disposed in a vehicle air supply line upstream of a manually controlled air valve which supplies the differential lock actuator. The speed switch normally supplies power to the air solenoid valve until the speed of the vehicle exceeds a predefined limit whereat power is discontinued to the air solenoid valve causing disengagement of the differential lock.

8 Claims, 3 Drawing Sheets

DRIVER-CONTROLLED DIFFERENTIAL LOCK CONTROL SYSTEM

BACKGROUND OF THE INVENTION

The present invention relates to a driver-controlled differential lock control system for trucks having an automatic manual transmission or a single range manual transmission, the lock being operable only at low vehicle speeds.

THE PRIOR ART

As is well known, a differential gear as used on cars, trucks, buses and other vehicles causes the engine power delivered to it—usually through the drive shaft—to be divided between two axles which usually drive the right and left rear wheels. Under normal driving conditions, it is desirable, especially when turning a corner, to divide engine power unequally between the wheels based on the speed of each wheel. That is, when the vehicle turns a corner, the wheel turning inside will travel a shorter distance than the wheel turning outside. Since they both must traverse their respective arcs in the same time, the inside wheel must turn more slowly than the outside one. The differential gear accomplishes this by apportioning engine power unequally between the wheels, as needed.

When increased traction is desired, some differential gears are constructed with means to lock-out their differential function—often by means of applying air pressure. When locked, the differential gear divides engine power equally to each axle. This can be helpful when it is necessary to travel over ice, mud or other difficult terrain, conditions wherein it is not desirable to deliver more power to the wheel that spins more freely, since that wheel is typically the one with the least traction.

Locking the differential is not appropriate for ordinary driving conditions, especially at high speeds; so it is desirable to permit locking the differential only below a predetermined speed. It is previously known to provide vehicles having high/low range selecting manual transmissions with differential locking controls that will permit the driver to engage the differential lock only when the gear shift has been placed in the low speed range. In these controls, placing the transmission in the low range opens a pneumatic control valve to supply air pressure to a driver operated control valve which, in turn, supplies pressure to the differential lock control to cause it to engage the lock. When the transmission is not in the low range, no air pressure is supplied to the driver operated valve. This control system automatically limits the maximum speed at which differential locking is permitted, because the vehicle can attain only a reduced maximum speed in the low speed range. However, many trucks and other vehicles have transmissions, such as automatic mechanical transmissions or a single-range manual transmissions, which do not have high/low range selection and do not have means to limit differential locking.

SUMMARY OF THE INVENTION

Accordingly, it is a primary object of the invention to provide a driver-controlled differential lock for vehicles having transmissions which do not provide high/low speed range shifting.

It is a further object of the invention to provide a differential lock which will automatically permit or prevent manual engagement of the differential lock based on vehicle speed.

It is a still further object of the invention to provide a differential lock which will automatically disengage when vehicle speed exceeds a predefined upper limit.

These objects, as well as others which will become more apparent hereinafter, are met by the driver-controlled differential lock system of the present invention which uses a speed sensor to produce a current which ultimately activates an air solenoid valve in an air line to supply a driver operated control valve which is selectively operated to supply air pressure to a pressure operated differential lock actuator to engage the lock. Should the speed of the vehicle exceed a predefined upper limit, a speed switch is provided which open to deenergize the air solenoid valve, cutting off the air supply to the driver controlled valve and therefore to the differential lock actuator to disengage the lock.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
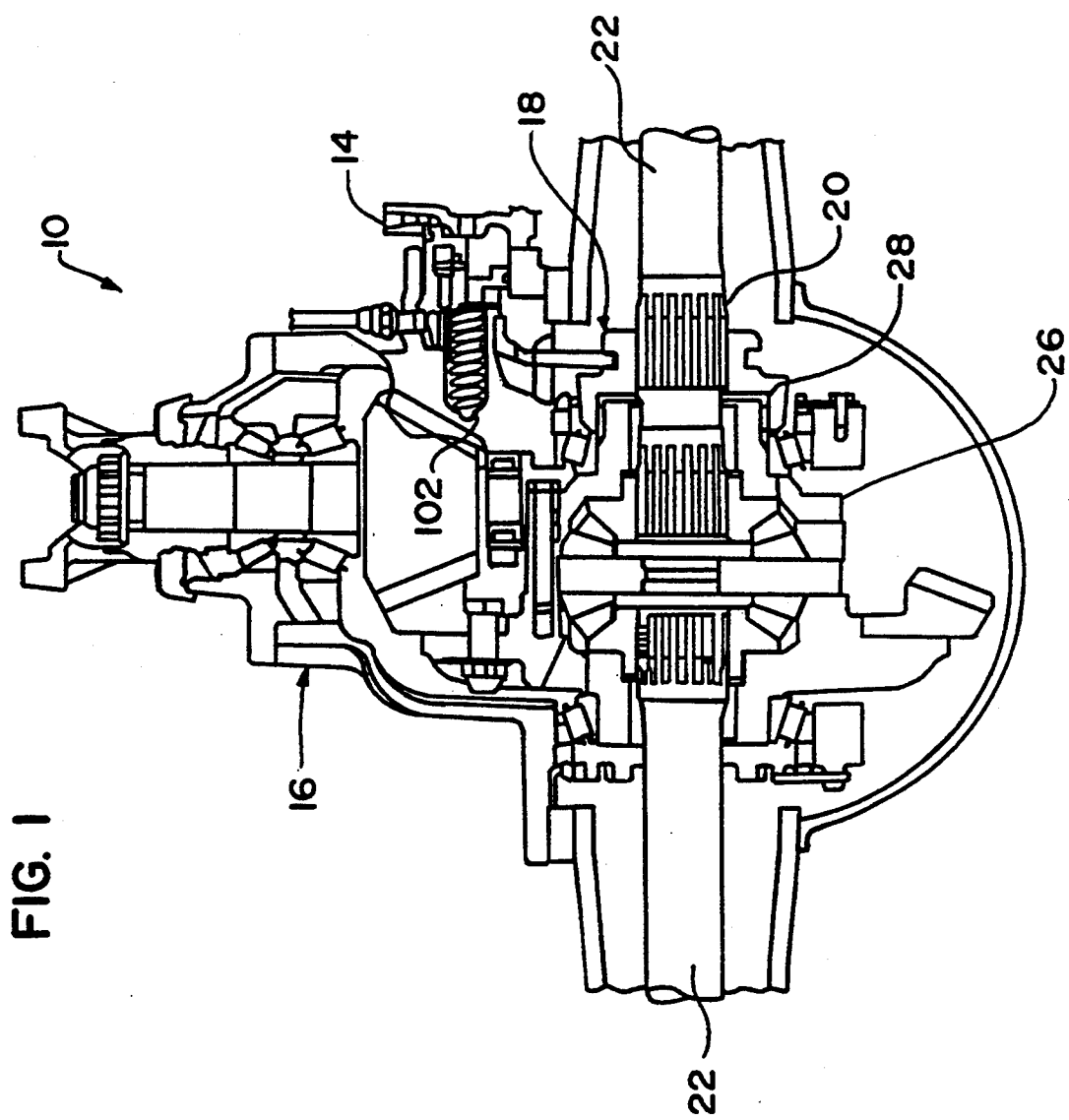
FIG. 1 is a perspective view of a differential system of a vehicle having an air pressure differential lock thereof which is shown engaged.

Referring now to the drawings in greater detail, there is illustrated in FIG. 1 a rear axle differential assembly 10 for a vehicle incorporating a driver-controlled differential lock assembly 11 which is operated by an air actuated shift assembly 14 that is mounted on a carrier 16 and includes a shift collar 18 slidably mounted on splines 20 of an axle shaft 22 and splines 28 disposed on a differential case 26. The shift collar 18 is slidable along the axle shaft splines 20 against the bias of spring 102, so that the splines 20 on the shift collar 18 may engage the splines 28 on the differential case 26. In this condition, the axle shafts 22 and differential case 26 are locked together so there is no differential action between the axle shafts 22 or the wheels (not shown) attached thereto. In the absence of air pressure to the shift assembly 14, the biassing spring 102 forces the assembly to a position wherein the shift collar splines do not engage the differential case 26 and there is normal differential action between the axle shafts 22.

The main differential lock assembly 11 is recommended to be operated only at vehicle speeds under approximately 25 mph and only when sharp turning is not required since with the differential 10 locked, the vehicle will have an understeer condition which will increase the turning radius of the vehicle.

Figure 2:
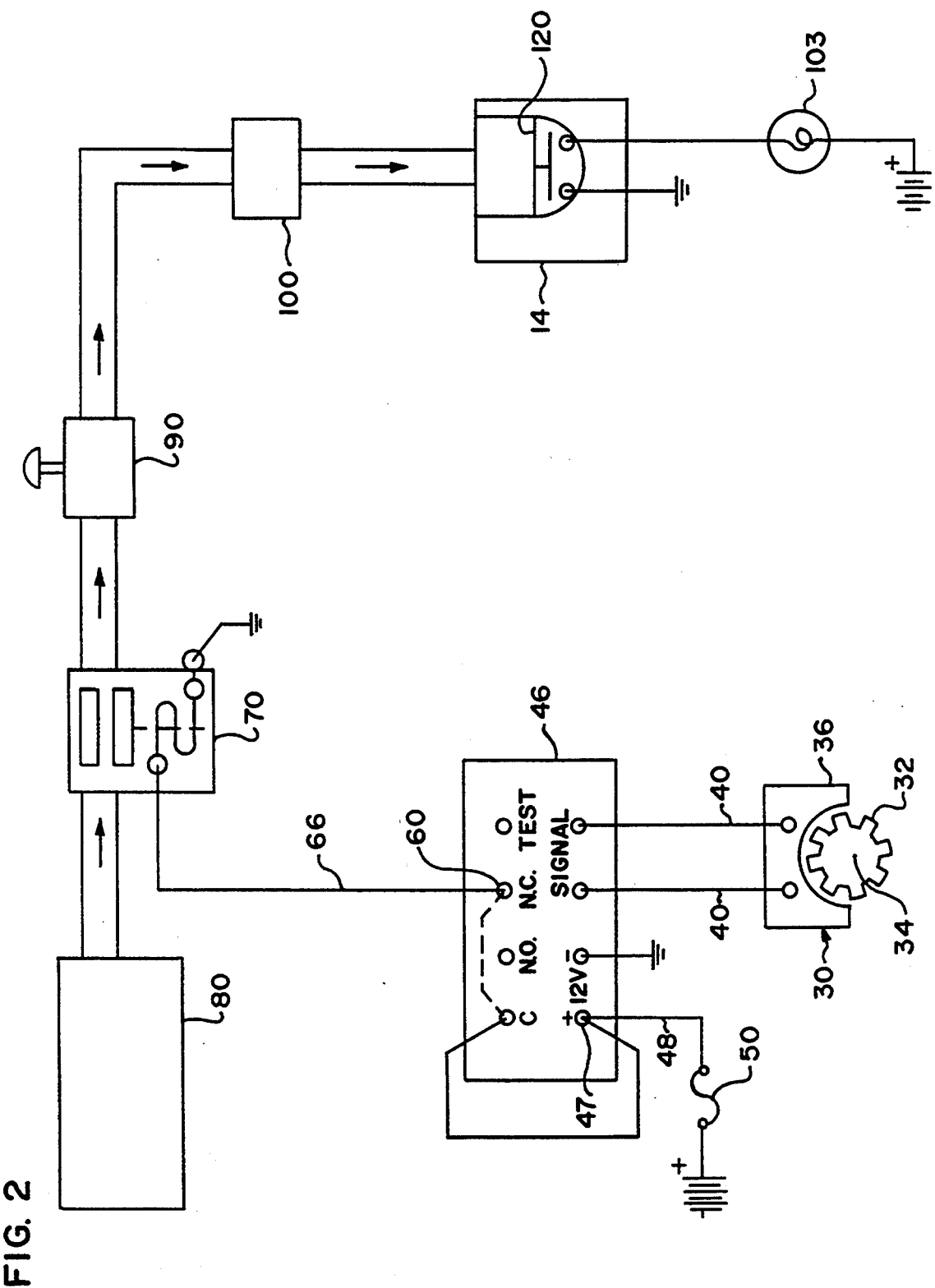
FIG. 2 is a combined schematic block and circuit diagram of the driver-controlled differential lock of the present invention for use with automatic manual transmissions and single range manual transmissions.

In accordance with the invention and referring now to FIG. 2, a well-known vehicle speed sensing means or sensor 30, such as a speedometer transmitter, includes a magnetic pickup 36 mounted in the transmission housing (not shown) to measure the rotational speed of teeth 32 disposed on the output or tail shaft 34 in a known manner. When the vehicle is in motion, each passage of a tooth 32 past the pick-up 36 will produce a pulse of current which passes through wires 40 to a speed switch 46. The speed switch 46 is a standard normally-closed relay logic switch available from Synchro-Start Products Inc. of Niles, Ill. under Model No. ESSE-1, which electronically measures the pulses delivered to it from the speed sensor 30 and remains closed below a predetermined setpoint corresponding to vehicle speed and opens when the setpoint is exceeded and until the vehicle speed falls more than 15–20% below the setpoint.

If the vehicle ignition is turned on, battery current will be supplied to input terminal 47 of speed switch 46 through a wire 48 and a fuse 50. When the vehicle's speed is below the setpoint, for example, 20 mph, current is allowed to flow from an output terminal 60 of the speed switch 46 through wire 66 to an air solenoid valve 70 causing it to open, allowing the air from the vehicular air supply tank 80 to flow to driver-controlled plunger valve 90.

With air pressure supplied through air solenoid valve 70, when the driver decides to engage the differential lock assembly 11, operating the driver-controlled plunger valve 90 will allow vehicular air pressure from the control valve 70 to flow through a quick release valve 100 and into the axle shift assembly 14 causing the differential lock assembly 11 to engage.

Driver-controlled plunger valve 90 is constructed so that once opened, it remains latched open until air pressure to it is removed. If air pressure is removed from the system, quick release valve 100 will vent any residual air pressure to atmosphere, thereby disengaging the differential lock assembly 11. Differential lock indicator 103 is operated by a pressure switch 120 and is illuminated when pressure switch 120 senses the presence of the air pressure for engaging the differential lock assembly 11, thus alerting the driver of such engagement.

In this manner, should the vehicle's speed increase above the desired limit for use of the differential lock assembly 11, speed switch 46 opens and deenergizes air solenoid 70 which closes and prevents vehicular air flow to driver-controlled plunger valve 90. Then should driver-controlled plunger valve 90 be closed, it will open due to lack of air pressure and quick release valve 100 will vent air pressure from the differential lock assembly 11, causing the axle shift assembly 14 to automatically disengage. Then, should the vehicle's speed be reduced 15–20% below the predetermined level, the differential lock assembly 11 may be reengaged by the driver in the manner described below.

To lock the differential lock assembly 11 for poor road conditions, when increased traction may be required, and with the vehicle speed well below the predetermined level, thereby causing the air solenoid 70 to open, the driver may push in the driver-controlled plunger valve 90 to the lock position. This allows air pressure to move the shift collar 18 inward against the bias of spring 102 to engage the splines 20 on the shift collar 18 respectively with the splines on the differential case 26 and the axle shaft 22. The driver next lets up momentarily on the vehicle accelerator (not shown) to relieve torque on the gearing, allowing the splines 20 to fully engage. The engaged splines 20 lock the differential case 26 and axle shafts 22 together and eliminate differential action between the wheels of the axle shafts 22. When the differential is locked, the lock indicator light 103 in the cab (not shown) will go on.

When the need for increased traction has passed, the differential lock assembly 11 may be unlocked and normal differential action between the wheels achieved by pulling the driver-controlled plunger valve 90 out to the unlocked position. This will shut off the air supply from the tank 80 to the differential shift assembly 14 on the carrier 16 thereby allowing the spring 102 inside the shift assembly 14 to move the shift collar 18 outwardly to disengage the splines 20 of the shift collar 18 from the differential case 26 and thereby unlock the differential assembly 10. Again, the driver preferably lets up momentarily on the accelerator to relieve torque on the gearing to allow the splines to fully disengage.

Thus, the driver may manually deactivate the driver-controlled plunger valve 90 to disengage the differential lock assembly 11 before he reaches the predetermined speed, if he so chooses. However, if the driver does not disengage the differential lock, the speed switch 46 will sense the vehicle speed exceeding the desired speed and automatically switch to its normally-open position. This will remove power supplied to the air solenoid 70 which will cut the air flow to the driver-controlled plunger valve 90. Without air pressure, the valve 90 will automatically unlatch and prevent air flow to the differential actuator, so that normal differential operation resumes.

Thus, the invention allows any vehicle—not just those equipped with low-range transmissions—to use differential locking and, by controlling the maximum speed at which differential locking is allowed to be engaged, limits its use to a desirable speed range. By utilizing the speed switch 46 in the manner described above, a vehicle with an automatic mechanical transmission or single range manual transmission is provided with better traction control for poor road conditions. An overspeed condition will not occur because the speed switch 46 monitors road speed continuously. If the vehicle is going too fast to engage the differential lock, the speed switch 46 will not allow the driver to engage it whether he pushes the driver control 90 or not. Further, the system is configured such that the differential actuator will not automatically reengage if the vehicle increases speed above the predetermined speed and then slows down to below the predetermined speed. The driver is always forced to make the decision to reengage the differential lock after he has dropped to a desirable speed level.

Figure 3:
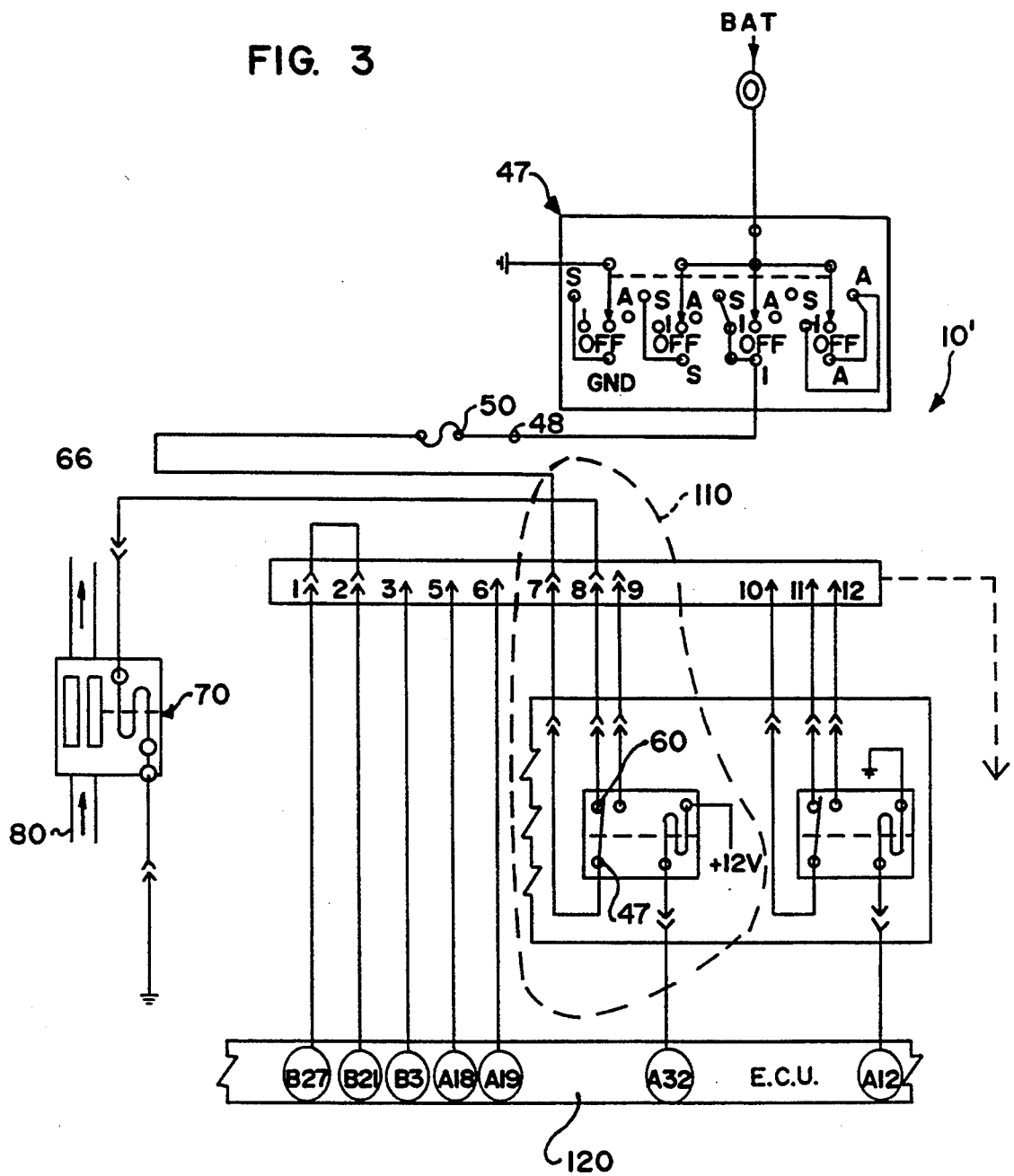
FIG. 3 is an alternative circuit diagram of the lock to be used with an electronically-controlled transmission.

To accommodate an electronically-controlled automatic transmission, such as the World Transmission manufactured by Allison Transmission Company, an alternative embodiment of the differential lock assembly 11 of FIG. 3 is proposed. In this embodiment, all of the components of the embodiment of FIGS. 1 and 2 are the same except as noted below.

In this embodiment, it will be seen that the speed switch 46 and sensor 30 have been replaced with a normally-open relay 110 incorporated in the vehicle interface module of the transmission (not shown) which is actuated by an output signal from an electronic control unit 120 of the transmission. The World Transmission incorporates a speed sensor (not shown) which measures tail shaft or output speed and the electronic control unit 120 is programmed to feed an output signal to the coil of relay 110 to close the contacts thereof and complete the circuit to the coil of the air solenoid 70 when tail shaft speed is sensed to be within the predetermined allowable range for the differential lock to be engaged.

Such minor modification can be easily made to accommodate electronic transmission or electronic engine control systems. Further, other modifications could be made for accommodating other types of differential locking mechanisms which may be available. Accordingly, the invention should only be construed as being limited in accordance with the scope of the appended claims.

What is claimed is:

1. A differential lock control system for use in a vehicle for controlling an air-pressure actuated vehicle differential locking device comprising:

vehicle speed sensing means;

speed switch means having an input terminal connected to a source of vehicle power and an output terminal, said speed switch means being responsive to said speed sensing means for selectively connecting said input terminal and said output terminal, said input and output terminals being normally connected and, upon said speed sensing means sensing a speed exceeding a predetermined vehicle speed, said input and output terminals being disconnected and upon said vehicle speed exceeding said predetermined speed and decelerating below said predetermined speed, said speed switch means maintaining said input and output terminals disconnected within a predetermined speed range below said predetermined speed; and a normally-closed air solenoid valve connected between a source of vehicle air pressure and said differential locking device, said air solenoid valve being operatively connected to said output terminal of said speed switch means to provide air pressure to said differential locking device only when a signal is present at said output terminal.

2. The differential lock control system of claim 1 wherein a manually controlled air valve is disposed in fluid communication between said air solenoid valve and said differential locking device for enabling selective manual actuation of said differential lock.

3. The differential lock control system of claim 2 wherein said vehicle speed sensing means comprises a speedometer transmitter.

4. The differential lock control system of claim 1 wherein said speed switch means is embodied in an electronically-controlled transmission interface module.

5. A driver-controlled differential lock control system for use in a vehicle for controlling an air-pressure actuated vehicle differential locking device comprising:

vehicle speed sensing means;

speed switch means having an input terminal connected to a source of vehicle power and an output terminal, said speed switch means including logic means responsive to said speed sensing means for selectively connecting said input terminal and said output terminal, said input and output terminals being normally connected and, upon said speed sensing means sensing a speed exceeding a predetermined vehicle speed, said input and output terminals being disconnected;

a manually operated mechanical air valve is disposed between a source of vehicle air pressure and said differential locking device for enabling selective manual actuation of said differential lock; and a normally-closed air solenoid valve connected in series fluid communication between said source of vehicle air pressure and said manually operated air valve, said air solenoid valve being operatively connected to said output terminal of said speed switch means to provide air pressure to said manually operated air valve when a signal is present at said output terminal.

6. The differential lock control system of claim 5 wherein, upon said vehicle speed exceeding said predetermined speed and decelerating below said predetermined speed, said logic means maintains said input and output terminals disconnected within a predetermined speed range below said predetermined speed.

7. In combination with a truck having a differential and an air-pressure actuated vehicle differential locking device, a differential lock control system comprising:

vehicle speed sensing means;

speed switch means having an input terminal connected to a source of vehicle power and an output terminal, said speed switch means including logic means responsive to said speed sensing means for selectively connecting said input terminal and said output terminal, said input and output terminals being normally connected and, upon said speed sensing means sensing a speed exceeding a predetermined vehicle speed, said input and output terminals being disconnected;

a normally-closed air solenoid valve connected between a source of vehicle air pressure and said differential locking device, said air solenoid valve being operatively connected to said output terminal of said speed switch means to provide air pressure to said differential locking device when a signal is present at said output terminal; and a manually controlled air valve disposed in series fluid communication between said air solenoid valve and said differential locking device for enabling selective manual actuation of said differential lock, said air valve requiring manual actuation subsequent to the opening of said air solenoid before said differential lock can be actuated.

8. The differential lock control system of claim 7 wherein, upon said vehicle speed exceeding said predetermined speed and decelerating below said predetermined speed, said logic means maintains said input and output terminals disconnected within a predetermined speed range below said predetermined speed.

* * * * *